US012722578B2

(12) United States Patent
Schlemmer et al.

(10) Patent No.: US 12,722,578 B2
(45) Date of Patent: Sep. 1, 2026

(54) INTERIOR COMPONENT FOR VEHICLES

(71) Applicant: Lisa Dräxlmaier GmbH, Vilsbiburg (DE)

(72) Inventors: Christian Schlemmer, Landshut (DE); Bernhard Bayersdorfer, Baierbach (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 134 days.

(21) Appl. No.: 18/762,003

(22) Filed: Jul. 2, 2024

(65) Prior Publication Data

US 2024/0351531 A1 Oct. 24, 2024

Related U.S. Application Data

(63) Continuation of application No. PCT/EP2022/085832, filed on Dec. 14, 2022.

(30) Foreign Application Priority Data

Jan. 3, 2022 (DE) ..................... 10 2022 100 064.8

(51) Int. Cl.
*B60R 11/02* (2006.01)
*H04R 1/02* (2006.01)

(52) U.S. Cl.
CPC .......... *B60R 11/0217* (2013.01); *H04R 1/023* (2013.01)

(58) Field of Classification Search
CPC .............. H04R 1/023; H04R 2201/021; H04R 2499/13
See application file for complete search history.

(56) References Cited

U.S. PATENT DOCUMENTS

2013/0001971 A1 1/2013 Stein

FOREIGN PATENT DOCUMENTS

| | | | | |
|---|---|---|---|---|
| DE | 102014015254 A1 | 3/2015 | | |
| DE | 102016122078 A1 | 6/2017 | | |
| DE | 202019106273 U1 | 12/2019 | | |
| DE | 102020003325 A1 | 10/2020 | | |
| DE | 102019134147 A1 | 6/2021 | | |
| EP | 3509318 A1 * | 7/2019 | ............. | H04R 1/023 |
| WO | WO-2016058652 A1 * | 4/2016 | ............. | H04R 1/028 |

* cited by examiner

*Primary Examiner* — Sunita Joshi
(74) *Attorney, Agent, or Firm* — Burris Law, PLLC

(57) ABSTRACT

An interior component for a vehicle including a speaker cover that includes a carrier with a plurality of openings for the sound transmission through the carrier, and a sound permeable cladding that is disposed on a sound exit side of the carrier. The carrier is formed at least in sections as a light conductor in order to guide light introduced into the carrier to the openings and/or to the cladding.

9 Claims, 2 Drawing Sheets

INTERIOR COMPONENT FOR VEHICLES

CROSS-REFERENCE TO RELATED APPLICATIONS

This application is a continuation of International Application No. PCT/EP2022/085832, filed on Dec. 14, 2022, which claims priority to and the benefit of DE 10 2022 100 064.8 filed on Jan. 3, 2022. The disclosure of each of the above-referenced applications is incorporated herein by reference.

FIELD

The present disclosure relates to an interior component with a loudspeaker cover to be used in a vehicle.

BACKGROUND

The statements in this section merely provide background information related to the present disclosure and may not constitute prior art.

Speaker covers are known that protect a speaker, in particular the sound generating speaker membrane of a speaker, from mechanical influences from the environment. For example, a speaker cover with through-holes and blind holes, as well as a hole-free edge, is known from US 2013/0001971 A1.

Independently thereof, speakers are known on which light sources are provided. In particular, DE 20 2019 106 273 U1 discloses an interior fitting component for a vehicle with a speaker that includes a membrane. The membrane is illuminated by a light source held close to the speaker.

The combinations of known speaker covers with speakers that include a light source have the disadvantage that the visual appearance of the speaker is distorted by the speaker cover. This is caused by the fact that the speaker cover periodically acts as an undesired perforated sheet between the light source on the speaker and the viewer.

In addition, the light may not distribute homogeneously through the speaker cover into the environment. Rather, the speaker cover leads to an undesired spotty, cloudy, or not high-quality light appearance.

SUMMARY

This section provides a general summary of the disclosure and is not a comprehensive disclosure of its full scope or all of its features.

The present disclosure provides an interior component for a vehicle with a loudspeaker cover that enables a homogeneous emission of light.

The loudspeaker cover includes a carrier and a sound-permeable cladding. The carrier comprises a plurality of openings for the sound transmission of a sound through the carrier. The sound can be generated, for example, by a loudspeaker that is disposed behind the loudspeaker cover. In addition, the carrier is configured at least in sections as a light conductor. Light that is guided into the carrier can thereby be guided by the carrier to the openings. Alternatively or additionally, the light can be guided by the carrier to the cladding. The cladding is disposed on the sound-exit side of the carrier.

The present disclosure provides an interior component for a vehicle, which interior component includes a loudspeaker cover. The loudspeaker cover comprises a carrier with a plurality of openings, in which the openings are configured for sound transmission through the carrier. The carrier can have a sound entry side and a sound exit side. The sound entry side is, in one example, defined such that a sound, in particular the sound of a loudspeaker that is covered by the loudspeaker cover, enters into the openings at the sound entry side of the carrier. The sound exit side can be defined such that the sound, in particular the sound of a loudspeaker that is covered by the loudspeaker cover, exits from the openings at the sound exit side of the carrier.

According to the present disclosure a sound permeable cladding is disposed on the sound output side of the carrier. The cladding can be a decorative cladding. In particular, the cladding can be visible for an observer who views the interior component in the installed state. The material of the cladding is, for example, leather, artificial leather, in one example made of renewable leather substitute materials, Alcantara, or another textile.

The carrier of the interior component is at least in sections formed as a light conductor. Light that is guided into the carrier can thereby be conducted by the carrier to the openings. Alternatively or additionally, the light can be guided by the carrier to the cladding. The light can exit from the carrier via the inner walls of the openings and/or via the sound exit side. The cladding is, in one example, backlit by the carrier.

The interior component has the advantage that the cladding can be backlit directly by the carrier. Unwanted reflections from a loudspeaker and/or from the installation space of the loudspeaker can thereby be precluded or at least reduced. The light can be emitted more homogeneously and/or more specifically from the openings and/or emitted onto the cladding.

A light conducting element is, in one example, surrounded by the carrier and/or is integrated into the carrier. For example, the light conducting element can have been overmolded or backmolded, in which the light conducting element and the plastic together form the carrier. Independently thereof, the carrier can be formed completely as a light conductor. For example, the carrier can be manufactured from a transparent plastic, in particular light transparent polycarbonate. The carrier is, in one example, manufactured by injection molding. The light conducting element and/or the carrier can have a multilayer and/or sandwich structure.

Additionally or alternatively, the light conducting element and/or the carrier can include a light permeable layer. For example, the light conducting element and/or the carrier can include a light permeable lacquer layer, in one example a light permeable lacquer layer made of polyurethane. The light permeable layer can be applied on one side onto the light conducting element and/or onto the carrier. Alternatively, the light permeable layer can be applied onto a plurality of lateral surfaces of the light conducting element and/or of the carrier. For example, the light conducting element and/or the carrier can be enveloped by the light permeable layer. The light permeable layer, in one example, has a lower refractive index than the light conducting element and/or the carrier. This has the effect that the light can be better coupled into the light conducting element and/or the carrier through the light permeable layer. Conversely, the light can also be better coupled out of the light conducting element and/or the carrier by the light permeable layer. This has the advantage that the light can be better guided to the openings and/or to the cladding.

The light conducting element and/or the carrier can include, for example, a surface structure that is suitable for light conduction and/or light coupling at least in sections. This surface structure can in particular be an eroded surface structure. The surface structure can be provided, for example, selectively, i.e., insularly, and/or only partially on the light conducting element and/or on the carrier. The core of the light conducting element and/or of the carrier can be highly transparent. This has the advantage that the light conducting capacity of the light conducting element and/or of the carrier is positively influenced.

In an example of the interior component, the carrier is connected to a light source. The light emitted from the light source is, in one example, introduced into the carrier. The light can be introduced directly or indirectly.

For example, one or more light sources can be disposed directly on the carrier and radiate into the carrier. The visual appearance of the carrier, in particular the light output of the light from the carrier, can be advantageously influenced by the number and/or the luminosity of the light sources. A further advantage of a light source disposed directly on the carrier is that only little installation space is used for the use of the light source.

Alternatively or additionally, the light source can be connected to the carrier via a light guide shaping, in particular a light that is not part of the carrier. For example, the light source can radiate into a light conductor shaping, in which the light is introduced into the carrier via the light guide shaping. This has the advantage that depending on the desired light exit from the carrier, the light can be introduced more specifically into the carrier. For example, the light exit from the carrier can be significantly influenced by the material thickness of the light conductor shaping, the light transparency of the light conductor shaping, the orientation of the light conductor shaping with respect to the carrier, and/or the number of light sources that are disposed on the light conductor shaping.

The light source is, in one example, LED, EKE or other light sources, such as, for example, programmable colored light sources. The interior component can comprise a plurality of light sources. This has the advantage that the light can be introduced at a plurality of points into the carrier depending on the desired light exit from the carrier.

In a further example of the interior component, the cladding comprises a light permeable perforation. The perforation can be dependent on the material, and/or additionally provided in the cladding. The perforation acts, for example, in a light permeable manner. The perforation, in one example, illuminates particularly brightly in comparison to the rest of the material of the cladding when the cladding is backlit by the carrier. This has the advantage that a particularly visually appealing illumination can be achieved by the interior component. In particular, the perforation can produce a particularly homogeneous and visually appealing light emission from the interior component.

In a further development of the preceding example, each perforation has a cross-sectional area that corresponds to between 30% and 50% of the cross-sectional area of an opening of the carrier. This causes that, despite the perforation in the cladding, the openings of the carrier are substantially covered by the cladding. This has the advantage that an observer looking at the interior component in the installed state cannot see the openings and the space behind the openings. In one example, the thickness or the material thickness of the carrier is selected such that an observer, when looking through the perforation, always looking at the carrier, independently of the viewing angle. This has the advantage that the cladding has no irregularly backlit regions. The illumination by the interior component is thus particularly homogeneous and visually appealing.

Alternatively or additionally, the cladding includes light permeable sections. The light permeable sections can be, for example, openings in the cladding that are, in one example, filled with a transparent material. The light permeable sections have the effect that the sections illuminate particularly brightly in comparison to the cladding when the cladding is backlit by the carrier. This has the advantage that a visually appealing illumination can be achieved by the interior component.

In a further example of the interior component, the carrier comprises optical interruptions. The light is, in one example, refracted and/or diverted at the interruptions. This causes that the light inside the carrier to be guided more specifically so that a directed light conduction in the carrier can be achieved. A homogeneous, diffuse, and/or directed light emission from the carrier is advantageously achieved by the use of interruptions.

According to a further development, the interior component comprises a sound permeable compensation layer. The compensation layer can be, for example, a transparent textile, a textile composite, a polymer, a film, a fleece, and/or an injection molded part. The compensation layer is, in one example, provided adjacent to or on the sound entry side and/or the sound exit side of the carrier.

The compensation layer, in one example, causes a homogeneous light emission from the carrier. This can be due to the light guided out of the carrier being homogeneously scattered by the compensation layer. For example, light shapes, in particular light silhouettes and light contours that are caused by the carrier, can be blurred, eliminated, and/or changed by the compensation layer.

Additionally or alternatively, the compensation layer can provide a light contrast compensation, in particular a high-low light compensation. The light contrast compensation can advantageously result in light spot avoidance.

Independently of the above-mentioned, advantageous effects of the compensation layer, the compensation layer can also be configured to reduce and/or eliminate undesired reflections. This means that the compensation layer can form an optical separating element and/or an optical damper. For example, the compensation layer can be disposed between the loudspeaker and the carrier such that the loudspeaker is not illuminated by the carrier.

In a further example of the interior component, the carrier is connected to the cladding via a transparent, UV-stable, and/or temperature resistant adhesive layer. In order to avoid the narrowing of openings in or on the openings, which narrowing of openings is harmful to the sound transparency, the inner walls of the openings of the carrier are, in one example, not wetted with the adhesive of the adhesive layer. The use of a transparent and UV-stable adhesive layer has the advantage that the interior component is simple and cost-effective to manufacture. The durability of the interior component can also be increased by the use of an adhesive layer. For the purpose of this present disclosure, the term "durability" is understood to mean not only the long-term fracture resistance of a component, but also of its optical stability. For example, the adhesive can be configured to yellow not at all or only very slightly.

In a further development, the interior component can include a loudspeaker. The loudspeaker is, in one example, not visible for an observer looking at the interior component in the installed state. The loudspeaker can be covered by the loudspeaker cover of the interior component. The loudspeaker is covered by the cladding and/or the carrier.

A sound permeable optical separating element is, in one example, provided between the loudspeaker and the carrier.

The separating element can be connected to the carrier or spaced apart from the carrier. Independently thereof, the separating element can be coated with a sound permeable compensation layer according to the above examples. The separating element advantageously causes that light emitted from the carrier cannot illuminate the loudspeaker. The separating element can be, for example, a fleece. Additionally or alternatively, the optical separating element can also be provided between the carrier and the cladding.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
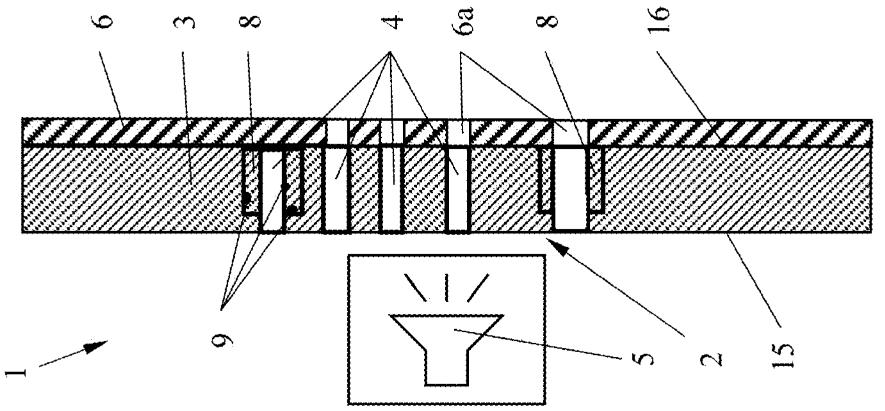
FIG. 2 shows a cross-sectional view of the section A-A indicated in FIG. 1 through the interior component according to the first example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The described, different and exemplary features can be combined with one another, provided this is technically useful and suitable. Further features, advantages, and examples arise from the following description of examples of the inventive interior fitting component and based on the figures.

Figure 1:
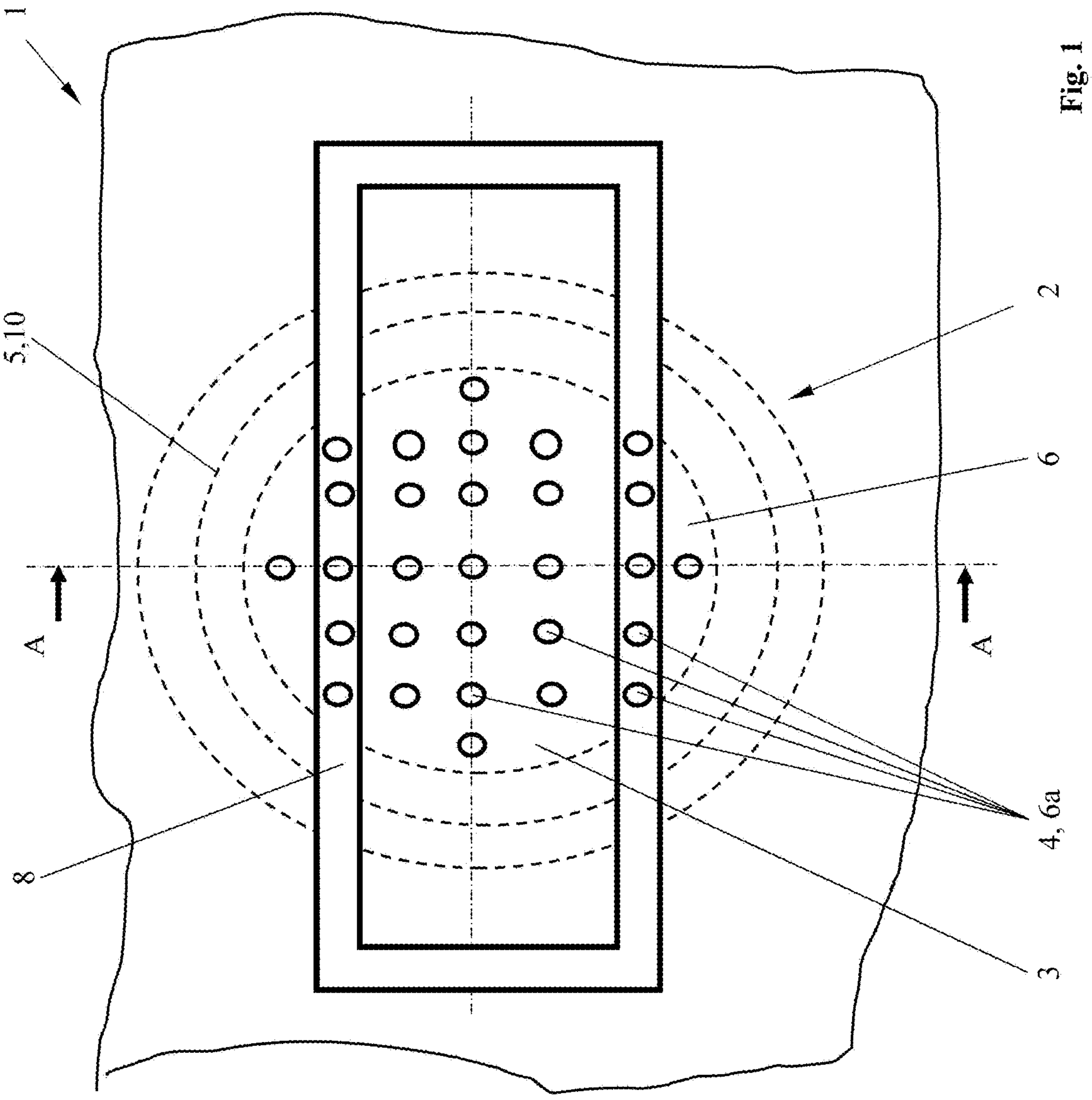
FIG. 1 shows a schematic top view of an interior component according to a first example of the present disclosure.

FIG. 1 shows a first example of an interior component 1 for a vehicle in a schematic plan view. The interior component 1 comprises a loudspeaker cover 2 that covers a loudspeaker 5. The circles shown dashed in FIG. 1 indicate the loudspeakers 5 disposed behind the interior component 1, in one example behind the loudspeaker cover 2. The loudspeaker 5 includes a sound membrane that is configured for generating a sound. The loudspeaker 5 is not visible for an observer looking at the interior component 1 from the perspective shown in FIG. 1.

The loudspeaker cover 2 comprises a carrier 3. The carrier 3 includes a plurality of openings 4, or through-openings, via which the sound of the loudspeaker 5 can penetrate through the carrier 3 and are configured to provide sound transmission. A sound permeable cladding 6 is disposed on the carrier 3. The cladding 6 includes a perforation 6*a* that is configured analogously to the openings 4. A size of a cross-sectional area of the perforation 6*a* of the sound permeable cladding 6 is between 30% and 50% of the size of a cross-sectional area of an opening of the openings 4 of the carrier 3.

The carrier 3 comprises a section that is configured as a light conducting element 8. Light that has been introduced into the light conducting element 8 can be guided to the openings 4 and to the cladding 6 via the light conducting element 8. For example, the light can be introduced laterally into the light conducting element 8 by a light source not depicted in FIG. 1.

FIG. 2 shows a sectional view of the section A-A indicated in FIG. 1. The carrier 3 has a sound entry side 15 and a sound exit side 16. The sound generated by the loudspeaker 5 reaches the sound entry side 15 on the carrier 3. The sound is transmitted through the carrier 3 via the openings 4 and exits the carrier 3 at the sound exit side 16. In the first example depicted in FIG. 1 and FIG. 2, the cladding 6 is disposed directly on the sound exit side 16 of the carrier 3.

The light conducting element 8 includes a plurality of optical imperfections 9 that are configured to refract and/or to divert or deflect the light guided through the light conducting element 8. The light exits from the light conducting element 8 on the inner surface of the openings 4. In addition, the light exits from the light conducting element 8 on the sound exit side 16 and at least partially backlights the cladding 6.

Figure 3:
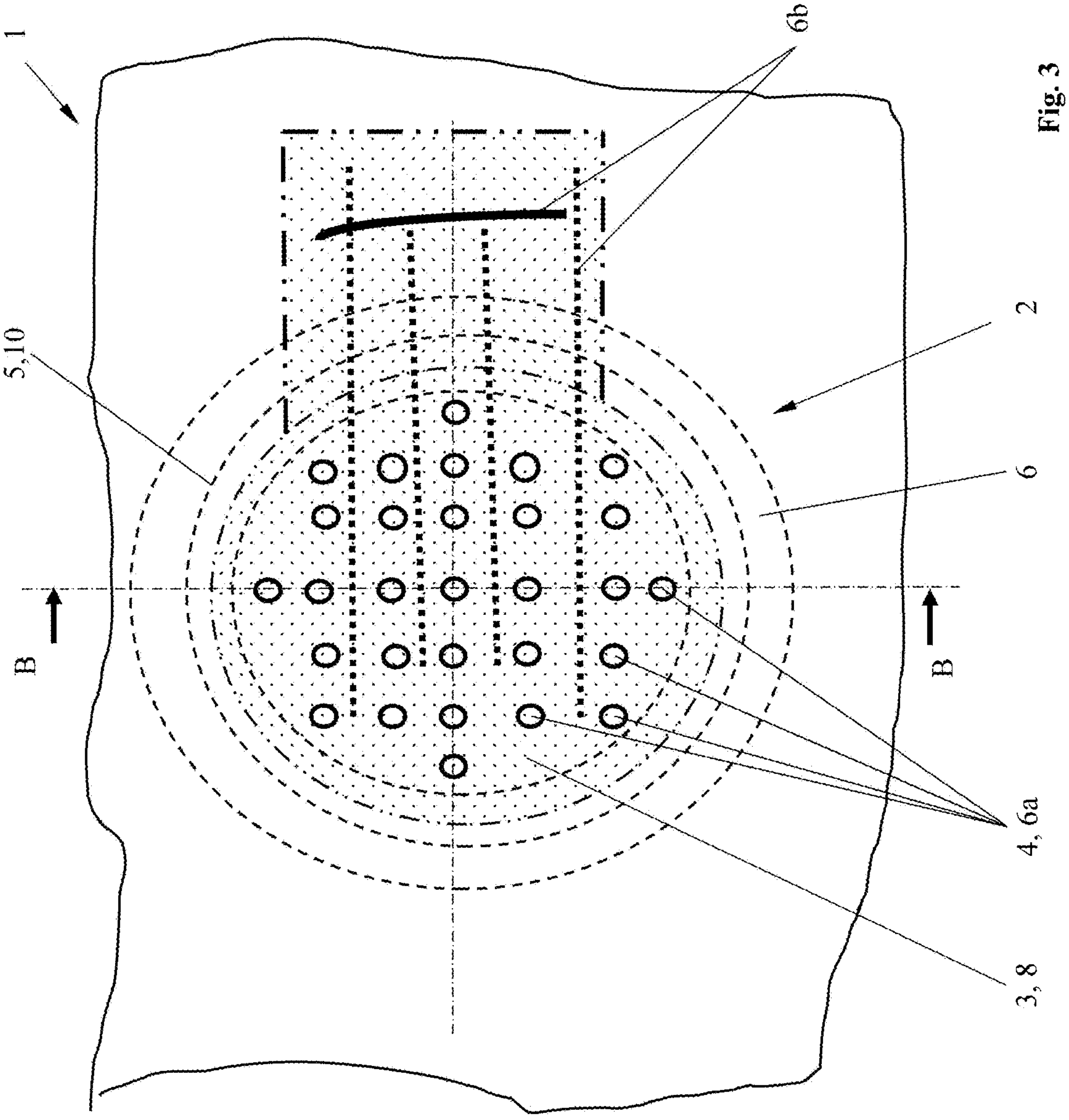
FIG. 3 shows a schematic top view of an interior component according to a second example of the present disclosure.

FIG. 3 shows a second example of an interior component 1 in a schematic plan view. The basic arrangement of the interior component 1 and of the loudspeaker 5 in the second example corresponds to the arrangement of the interior component 1 and of the loudspeaker 5 in the first example.

In contrast to the first example, in the second example the carrier 3 is configured completely as a light conducting element 8. This means that the light introduced into the carrier 3 is guided by the entire carrier 3 to the openings 4 and the cladding 6. The cladding 6 is backlit by the carrier 3. In addition, the sound permeable cladding 6 also includes a plurality of light permeable section 6*b* in addition to the perforation 6*a*. The light-transparent and sections 6*b* can include a transparent material.

Figure 4:
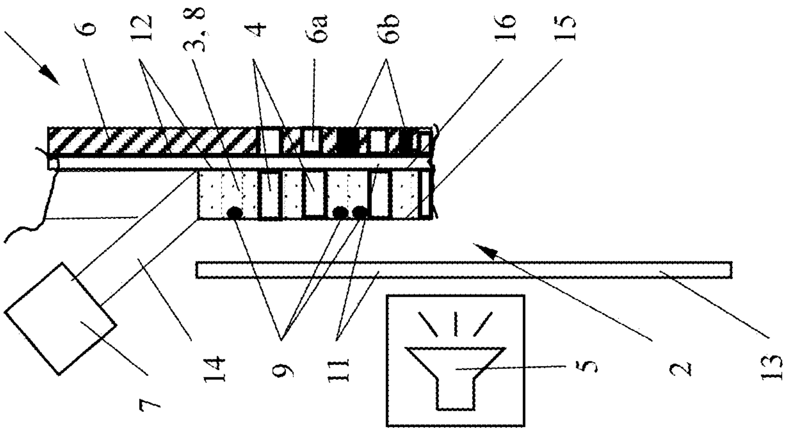
FIG. 4 shows a cross-sectional view of the section B-B indicated in FIG. 3 through the interior component according to the second example.

FIG. 4 shows a sectional representation of the section B-B indicated in FIG. 3. An optical separating element 13 is disposed between the loudspeaker 5 and the loudspeaker cover 2. The optical separating element 13 is sound permeable and causes that the light that is emitted from the carrier 3 toward the loudspeaker 5 does not illuminate the loudspeaker 5, or at least illuminates the loudspeaker 5 by a reduced amount. The optical separating element 13 is a compensation layer 11 configured specifically for this purpose. Instead of the optical separating element 13, the compensation layer 11 can also have only a light damping effect at this location.

The carrier 3 is connected to a light source 7 in a light-communicating manner via a light conductive shaping 14. The light emitted from the light source 7 is guided into the carrier 3 via the light conductive shaping 14. Via the carrier 3, the light is then guided to the openings 4, in one example to the inner surfaces of the openings 4, and the cladding 6. For the latter the light is also guided out via the side wall of the carrier 3 onto the sound exit side 16. For this purpose, the optical imperfections 9 are disposed on the sound entry side 15 opposite the sound exit side 16 of the carrier 3. At the optical imperfections 9 the light is thus refracted and/or reflected such that the light exits from the carrier 3 on the opposite side wall of the carrier 3, namely on the sound exit side 16, in the direction of the cladding 6.

In the second example, a sound permeable compensation layer 11 is applied on the sound exit side 16 of the carrier 3. The compensation layer 11 causes a homogeneous light emission from the carrier 3. The compensation layer 11 can strengthen or supplement the effect of the optical imperfections 9. Additionally or alternatively, the compensation layer 11 can also at least partially inhibit an exit of the light from the carrier 3. The sound-permeable compensation layer 11 is configured to result in a light-contrast balancing.

As shown in FIG. 4, in the second example, the cladding 6 is connected to the compensation layer 11 via an adhesive layer 12. The compensation layer 11 is connected to the carrier 3 via a further adhesive layer 12. The adhesive layer 12 is, in one example, configured transparent and UV-stable.

The perforation 6*a* and the light permeable sections 6*b* of the cladding 6 are backlit by the carrier 3. This means that for an observer that looking at the interior component 1, in one example at the loudspeaker cover 2 in FIG. 4 from right to left, the areas of the cladding 6 at which the cladding 6 has a perforation 6*a* or a light permeable section 6*b* illuminate more brightly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An interior component for a vehicle, comprising:

a loudspeaker cover that includes a carrier with a plurality of through-openings for sound transmission through the carrier, and a sound-permeable cladding that is disposed on a sound-outlet side of the carrier, and the carrier is configured at least sectionally as a light conductor in order to guide light introduced into the carrier to the plurality of through-openings and to the sound-permeable cladding; and a sound-permeable compensation layer that includes an altered light outlet is applied on the carrier, and a loudspeaker is optically covered by the loudspeaker cover, wherein the carrier includes optical imperfections configured to perform at least one of refraction and deflection of the light, and the optical imperfections result in at least one of a directed light-guiding into the carrier and a homogeneous light output from the carrier.

2. The interior component according to claim 1, wherein the carrier is connected with a light source, and the light emitted from the light source is introduced into the carrier.

3. The interior component according to claim 1, wherein the sound-permeable cladding includes at least one of a light-permeable perforation and a light-permeable section that is backlit by the carrier.

4. The interior component according to claim 3, wherein a size of a cross-sectional area of a perforation of the sound-permeable cladding is between 30% and 50% of a size of a cross-sectional area of a through-opening of the plurality of through-openings of the carrier.

5. The interior component according to claim 1, wherein the sound-permeable cladding covers the plurality of through-openings of the carrier.

6. The interior component according to claim 1, wherein the sound-permeable cladding is connected with the carrier by a transparent and UV-stable adhesive layer.

7. The interior component according to claim 1, wherein a sound-permeable optical separating element is provided between the loudspeaker and the carrier.

8. The interior component according to claim 1, wherein the sound-permeable compensation layer is configured to result in a light-contrast balancing.

9. The interior component according to claim 1, wherein the sound-permeable compensation layer is configured to reduce reflections.

* * * * *